United States Patent
Sun et al.

(10) Patent No.: US 11,747,591 B2
(45) Date of Patent: Sep. 5, 2023

(54) CAMERA OPTICAL LENS

(71) Applicant: AAC Optics (Changzhou) Co., Ltd., Changzhou (CN)

(72) Inventors: Wen Sun, Shenzhen (CN); Jia Chen, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 384 days.

(21) Appl. No.: 17/134,176

(22) Filed: Dec. 25, 2020

(65) Prior Publication Data

US 2022/0066136 A1 Mar. 3, 2022

(30) Foreign Application Priority Data

Aug. 26, 2020 (CN) .......................... 202010867244.5

(51) Int. Cl.
*G02B 9/60* (2006.01)
*G02B 13/18* (2006.01)

(52) U.S. Cl.
CPC ............... *G02B 9/60* (2013.01); *G02B 13/18* (2013.01)

(58) Field of Classification Search
CPC ...... G02B 9/60; G02B 13/18; G02B 13/0045; G02B 13/06
See application file for complete search history.

(56) References Cited

U.S. PATENT DOCUMENTS 9,927,598 B2 * 3/2018 Huang ..................... G02B 9/62
2014/0177076 A1 * 6/2014 Hsu .................. G02B 13/0045
359/714

* cited by examiner

*Primary Examiner* — Robert E. Tallman
(74) *Attorney, Agent, or Firm* — W&G Law Group

(57) ABSTRACT

The present invention relates to the field of optical lenses, and provides a camera optical lens, including, from an object side to an image side, a first lens, a second lens, a third lens, a fourth lens, and a fifth lens. At least one of the first lens to the fifth lens has a free-form surface, and the camera optical lens satisfies: $-3.50 \leq f2/f \leq -1.50$; $-2.00 \leq (R5+R6)/(R5-R6) \leq 0.20$; and $1.00 \leq f4/f \leq 5.50$, where f denotes a focal length of the camera optical lens, f2 denotes a focal length of the second lens, f4 denotes a focal length of the fourth lens, R5 denotes a central curvature radius of an object side surface of the third lens, and R6 denotes a central curvature radius of an image side surface of the third lens. The camera optical lens according to the present invention has a large aperture, a wide angle and ultra-thinness, as well as excellent optical performance.

9 Claims, 8 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, and for imaging devices such as monitors and PC lenses.

BACKGROUND

With the development of camera lenses, higher and higher requirements are put forward for imaging quality of the lenses. The "night scene photography" and "bokeh" of the lens have also become important indexes to measure the imaging performances of the lens. At present, rotationally symmetric aspherical surfaces are mostly used. Such an aspherical surface has a sufficient degree of freedom only in a meridian plane, and cannot well correct off-axis aberration. The existing structures have insufficient refractive power allocation, lens spacing and lens shape settings, resulting in insufficient ultra-thinness and wide angle of the lenses. A free-form surface is a non-rotationally symmetric surface, which can better balance aberration and improve the imaging quality; besides, processing of the free-form surface has gradually become mature. With the increasing requirements for imaging of the lens, it is very important to provide a free-form surface in the design of a lens, especially in the design of wide-angle and ultra-wide-angle lenses.

SUMMARY

In view of the above-mentioned problems, a purpose of the present invention is to provide a camera optical lens, which has the characteristics of a large aperture, a wide angle and ultra-thinness, as well as excellent optical performance.

In order to solve the above-mentioned technical problem, an embodiment of the present invention provide a camera optical lens, including from an object side to an image side, a first lens having a positive refractive power, a second lens a negative refractive power, a third lens having a positive refractive power, a fourth lens having a positive refractive power, and a fifth lens having a negative refractive power. At least one of the first lens to the fifth lens has a free-form surface, and the camera optical lens satisfies following conditions: $-3.50 \le f2/f \le -1.50$; $-3.50 \le f2/f \le -1.50$; $-2.00 \le (R5+R6)/(R5-R6) \le 0.20$; and $1.00 \le f4/f \le 5.50$, where f denotes a focal length of the camera optical lens, f2 denotes a focal length of the second lens, f4 denotes a focal length of the fourth lens, R5 denotes a central curvature radius of an object side surface of the third lens, and R6 denotes a central curvature radius of an image side surface of the third lens In an improved embodiment, the camera optical lens further satisfies a following condition: $0.95 \le d3/d4 \le 4.00$, where d3 denotes an on-axis thickness of the second lens, and d4 denotes an on-axis distance from an image side surface of the second lens to an object side surface of the third lens.

In an improved embodiment, the camera optical lens further satisfies following conditions: $0.46 \le f1/f \le 1.55$; $-3.88 < (R1+R2)/(R1-R2) \le -1.02$; and $0.06 \le d1/TTL \le 0.22$, where f1 denotes a focal length of the first lens, R1 denotes a central curvature radius of an object side surface of the first lens, R2 denotes a central curvature radius of an image side surface of the first lens, d1 denotes an on-axis thickness of the first lens, and TTL denotes a total optical length from an object side surface of the first lens to an image plane of the camera optical lens along an optic axis In an improved embodiment, the camera optical lens further satisfies following conditions: $-5.62 \le (R3+R4)/(R3-R4) \le -0.75$; and $0.02 \le d3/TTL \le 0.08$, where R3 denotes a central curvature radius of an object side surface of the second lens, R4 denotes a central curvature radius of an image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $1.39 \le f3/f \le 8.09$; and $0.03 \le d5/TTL \le 0.24$, where f3 denotes a focal length of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $0.23 \le (R7+R8)/(R7-R8) \le 3.38$; and $0.06 \le d7/TTL \le 0.21$, where R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

In an improved embodiment, the camera optical lens further satisfies following conditions: $-3.40 \le f5/f \le -0.51$; $0.79 \le (R9+R10)/(R9-R10) \le 5.02$; and $0.05 \le d9/TTL \le 0.25$, where f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis In an improved embodiment, the camera optical lens further satisfies a following condition: $TTL/IH \le 1.60$, where TTL denotes a total optical length from an object side surface of the first lens to an image plane of the camera optical lens along an optic axis, and IH denotes an image height of the camera optical lens.

In an improved embodiment, the camera optical lens further satisfies a following condition: $FOV \ge 77°$, where FOV denotes a field of view of the camera optical lens.

In an improved embodiment, the camera optical lens further satisfies: $FNO \le 2.21$, where FNO denotes an F number of the camera optical lens.

The beneficial effects of the present invention are a follows. The camera optical lens according to the present invention has a large aperture, a wide angle and ultra-thinness, as well as excellent optical performance. Meanwhile, at least one of the first lens to the fifth lens has a free-form surface, which is beneficial to correct aberration and field curvature of the system and improve the performance of the optical system, and is especially suitable for mobile phone camera lens assembly and WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

In order to better illustrate the purpose, technical solutions and advantages of the present invention, the embodiments of the present invention will be described in details as follows with reference to the accompanying drawings. However, it should be understood by those skilled in the art that, technical details are set forth in the embodiments of the present invention so as to better illustrate the present invention. However, the technical solutions claimed in the present invention can be achieved without these technical details and various changes and modifications based on the following embodiments.

Embodiment 1

Figure 1:
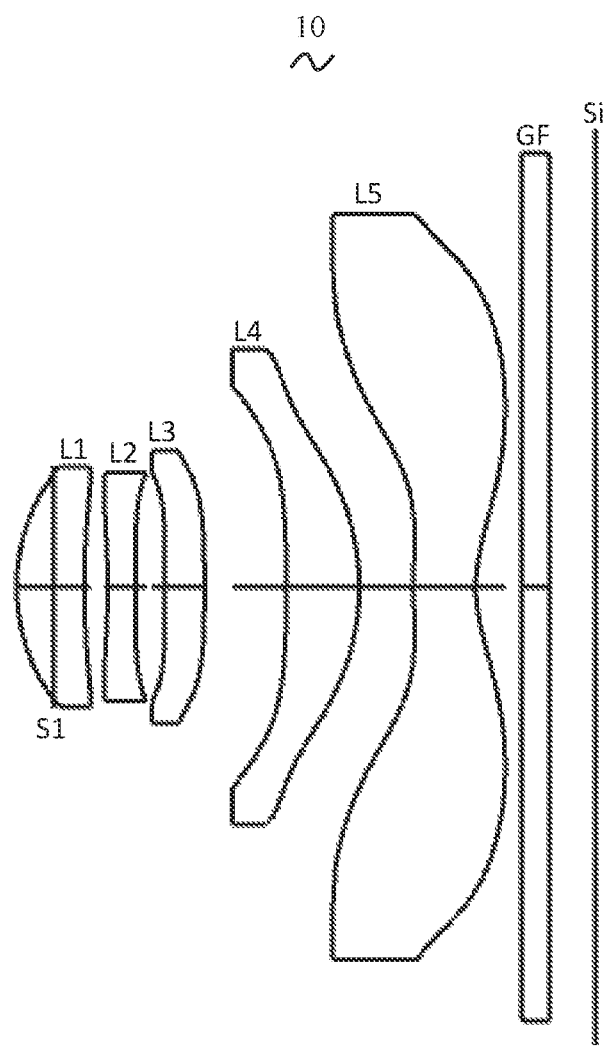
FIG. 1 is a schematic structural diagram of a camera optical lens according to Embodiment 1 of the present invention.

With reference to the accompanying drawings, the present invention provides a camera optical lens 10. FIG. 1 illustrates a camera optical lens 10 according to Embodiment 1 of the present invention. The camera optical lens 10 includes five lenses. Specifically, the camera optical lens 10 includes, from an object side to an image side, an aperture S1, a first lens L1, a second lens L2, a third lens L3, a fourth lens L4, and a fifth lens L5. Optical elements such as an optical filter GF may be arranged between the fifth lens L5 and an image plane Si.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material. In other embodiments, the lenses may be made of other materials.

In this embodiment, at least one of the first lens L1 to the fifth lens L5 includes a free-form surface, and the free-form surface is beneficial to correct distortion and field curvature of the system, and improve imaging quality.

In this embodiment, it is defined that a focal length of the camera optical lens 10 is f, a focal length of the second lens L2 is f2, and the camera optical lens satisfies the following condition: $-3.50 \leq f2/f \leq -1.50$, which specifies a ratio of the focal length of the second lens to the focal length of the camera optical lens. Within a range defined by this condition, it is beneficial to improve the imaging quality.

It is defined that a central curvature radius of an object side surface of the third lens L3 is R5, a central curvature radius of an image side surface of the third lens L3 is R6, and the camera optical lens further satisfies the following condition: $-2.00 \leq (R5+R6)/(R5-R6) \leq 0.20$, which specifies a shape of the third lens. Within a range defined by this condition, it is beneficial to reduce a degree of light deflection and improve the imaging quality.

It is defined that the focal length of the camera optical lens 10 is f, a focal length of the fourth lens L4 is f4, and the camera optical lens further satisfies the following condition: $1.00 \leq f4/f \leq 5.50$, which specifies a ratio of the focal length of the fourth lens to the focal length of the camera optical lens. Within a range defined by this condition, it is beneficial to improve the imaging performance of the system.

It is defined that an on-axis thickness of the second lens L2 is d3, an on-axis distance from an image side surface of the second lens L2 to an object side surface of the third lens L3 is d4, and the camera optical lens further satisfies the following condition: $0.95 \leq d3/d4 \leq 4.00$. Within a range defined by this condition, it is beneficial to reduce a total length of the system.

In this embodiment, the first lens L1 has a positive refractive power, the object side surface of the first lens L1 is a convex surface at a paraxial position, and the image side surface of the first lens L1 is a concave surface at a paraxial position.

It is defined that a focal length of the first lens L1 is f1, the focal length of the camera optical lens 10 is f, and the camera optical lens further satisfies the following condition: $0.46 \leq f1/f \leq 1.55$, which specifies a ratio of the focal length of the first lens L1 to the focal length of the camera optical lens 10. Within a range defined by this condition, the first lens has an appropriate positive refractive power, which is beneficial to reduce aberration of the system and achieve ultra-thinness and a wide angle of the camera optical lens. As an example, the camera optical lens further satisfies the following condition: $0.73 \leq f1/f \leq 1.24$.

A central curvature radius of the object side surface of the first lens L1 is R1, a central curvature radius of the image side surface of the first lens L1 is R2, and the camera optical lens further satisfies the following condition: $-3.88 \leq (R1+R2)/(R1-R2) \leq -1.02$. By reasonably controlling a shape of the first lens L1, the first lens L1 can effectively correct spherical aberration of the system. As an example, the camera optical lens further satisfies the following condition: $-2.42 \leq (R1+R2)/(R1-R2) \leq -1.27$.

An on-axis thickness of the first lens L1 is d1, a total optical length from an object side surface of the first lens L1 to the image plane of the camera optical lens 10 along the optic axis is TTL, and the camera optical lens further satisfies the following condition: $0.06 \leq d1/TTL \leq 0.22$. Within a range defined by this condition, it is beneficial to achieve ultra-thinness. As an example, the camera optical lens further satisfies the following condition: $0.09 \leq d1/TTL \leq 0.18$.

In this embodiment, the second lens L2 has a negative refractive power, the object side surface of the second lens L2 is a concave surface at a paraxial position, and the image side surface of the second lens L2 is a convex surface at a paraxial position.

It is defined that a central curvature radius of the object side surface of the second lens L2 is R3, a central curvature radius of the image side surface of the second lens L2 is R4, and the camera optical lens further satisfies the following condition: $-5.62 \leq (R3+R4)/(R3-R4) \leq -0.75$, which specifies a shape of the second lens L2. Within a range defined by this condition, with the development of ultra-thinness and wide angle of the camera optical lens, it is beneficial to correct longitudinal aberration. As an example, the camera optical lens further satisfies the following condition: $-3.51 \leq (R3+R4)/(R3-R4) \leq -0.94$.

An on-axis thickness of the second lens L2 is d3, the total optical length from the object side surface of the first lens to the image plane of the camera optical lens 10 along the optic axis is TTL, and the camera optical lens further satisfies the following condition: $0.02 \leq d3/TTL \leq 0.08$. Within a range defined by this condition, it is beneficial to achieve ultra-thinness. As an example, the camera optical lens further satisfies the following condition: $0.04 \leq d3/TTL \leq 0.06$.

In this embodiment, the third lens L3 has a positive refractive power, the object side surface of the third lens L3 is a convex surface at a paraxial position, and the image side surface of the third lens L3 is a convex surface at a paraxial position.

It is defined that a focal length of the third lens L3 is f3, the focal length of the camera optical lens 10 is f, and the camera optical lens further satisfies the following condition: $1.39 \leq f3/f \leq 8.09$. Reasonable refractive power allocation enables the system to have better imaging quality and lower sensitivity. As an example, the camera optical lens further satisfies the following condition: $2.23 \leq f3/f \leq 6.47$.

An on-axis thickness of the third lens L3 is d5, the total optical length from the object side surface of the first lens to the image plane of the camera optical lens 10 along the optic axis is TTL, and the camera optical lens further satisfies the following condition: $0.03 \leq d5/TTL \leq 0.24$. Within a range defined by this condition, it is beneficial to achieve ultra-thinness. As an example, the camera optical lens further satisfies the following condition: $0.05 \leq d5/TTL \leq 0.19$.

In this embodiment, the fourth lens L4 has a positive refractive power, the object side surface of the fourth lens L4 is a concave surface at a paraxial position, and the image side surface of the fourth lens L4 is a convex surface at a paraxial position.

It is defined that a central curvature radius of an object side surface of the fourth lens L4 is R7, a central curvature radius of an image side surface of the fourth lens L4 is R8, and the camera optical lens further satisfies the following condition: $0.23 \leq (R7+R8)/(R7-R8) \leq 3.38$, which specifies a shape of the fourth lens L4. Within a range defined by this condition, with the development of ultra-thinness and wide angle, it is beneficial to correct off-axis aberration. As an example, the camera optical lens further satisfies the following condition: $0.38 \leq (R7+R8)/(R7-R8) \leq 2.70$.

An on-axis thickness of the fourth lens L4 is d7, the total optical length from the object side surface of the first lens to the image plane of the camera optical lens 10 along the optic axis is TTL, and the camera optical lens further satisfies the following condition: $0.06 \leq d7/TTL \leq 0.21$. Within a range defined by this condition, it is beneficial to achieving ultra-thinness. As an example, the camera optical lens further satisfies the following condition: $0.09 \leq d7/TTL \leq 0.16$.

In this embodiment, the fifth lens L5 has a negative refractive power, the object side surface of the fifth lens L5 is a convex surface at a paraxial position, and the image side surface of the fifth lens L5 is a concave surface at a paraxial position.

It is defined that a focal length of the fifth lens L5 is f5, the focal length of the camera optical lens 10 is f, and the camera optical lens further satisfies the following condition: $-3.40 \leq f5/f \leq -0.51$. The limitation on the fifth lens L5 can effectively smooth a light angle of the camera lens and reduce tolerance sensitivity. As an example, the camera optical lens further satisfies the following condition: $-2.13 \leq f5/f \leq -0.64$.

A central curvature radius of the object side surface of the fifth lens is R9, a central curvature radius of the image side surface of the fifth lens is R10, and the camera optical lens further satisfies the following condition: $0.79 \leq (R9+R10)/(R9-R10) \leq 5.02$, which specifies a shape of the fifth lens L5. Within a range defined by this condition, with the development of ultra-thinness and wide angle, it is beneficial to correct off-axis aberration. As an example, the camera optical lens further satisfies the following condition: $1.27 \leq (R9+R10)/(R9-R10) \leq 4.02$.

An on-axis thickness of the fifth lens L5 is d9, a total optical length from an object side surface of the first lens to an image plane of the camera optical lens 10 along the optic axis is TTL, and the camera optical lens further satisfies the following condition: $0.05 \leq d9/TTL \leq 0.25$. Within a range defined by this condition, it is beneficial to achieve ultra-thinness. As an example, the camera optical lens further satisfies the following condition: $0.09 \leq d9/TTL \leq 0.20$.

In this embodiment, the total optical length from the object side surface of the first lens to the image plane of the camera optical lens 10 along the optic axis is TTL, an image height of the camera optical lens 10 is IH, and the camera optical lens further satisfies the following condition: $TTL/IH \leq 1.60$, thereby achieving ultra-thinness.

In this embodiment, the field of view of the camera optical lens is FOV, which further satisfies the following condition: $FOV \geq 77°$, thereby achieving a wide angle.

In this embodiment, an F number of the camera optical lens 10 is FNO, which is smaller than or equal to 2.21. Large aperture leads to good imaging performance.

When the above-mentioned conditions are further satisfied, the camera optical lens 10 has good optical performance, and when the free-form surface is adopted, the designed image plane area can be matched with an actual use area, thereby improving the image quality of the effective area to the greatest extent; and based on the characteristics of the camera optical lens 10, the camera optical lens 10 is especially suitable for a mobile phone camera lens assembly and a WEB camera lens composed of imaging elements such as CCD and CMOS for high pixels.

The camera optical lens 10 of the present invention will be described in the following by examples. The symbols described in each example are as follows. The the focal length, the on-axis distance, the curvature radius, and the on-axis thickness are all expressed in units of mm.

TTL: a total optical length (an on-axis distance from the object side surface of the first lens L1 to the image plane along an optic axis), with a unit of mm.

FNO: an F number (a ratio of an effective focal length of the camera optical lens to an entrance pupil diameter).

Table 1 and Table 2 show design data of the camera optical lens 10 according to Embodiment 1 of the present invention. Herein, only the object side surface and the image side surface of the second lens L2 are free-form surfaces, but in other embodiments, more than one lens may have the free-form surface.

TABLE 1

| | R | d | | nd | | vd |
|---|---|---|---|---|---|---|
| S1 | ∞ | d0 = | −0.286 | | | |
| R1 | 1.468 | d1 = | 0.516 | nd1 | 1.5444 | v1 | 55.82 |
| R2 | 7.015 | d2 = | 0.178 | | | |
| R3 | −4.533 | d3 = | 0.210 | nd2 | 1.6700 | v2 | 19.39 |
| R4 | −39.835 | d4 = | 0.221 | | | |
| R5 | 23.770 | d5 = | 0.303 | nd3 | 1.5444 | v3 | 55.82 |
| R6 | −19.205 | d6 = | 0.629 | | | |
| R7 | −8.774 | d7 = | 0.552 | nd4 | 1.5444 | v4 | 55.82 |
| R8 | −1.764 | d8 = | 0.413 | | | |
| R9 | 4.917 | d9 = | 0.474 | nd5 | 1.5444 | v5 | 55.82 |
| R10 | 1.119 | d10 = | 0.351 | | | |
| R11 | ∞ | d11 = | 0.210 | ndg | 1.5168 | vg | 64.17 |
| R12 | ∞ | d12 = | 0.351 | | | |

Herein, the symbols are defined as follows.

S1: aperture;

R: curvature radius at a center of an optical surface;

R1: central curvature radius of an object side surface of a first lens L1;

R2: central curvature radius of an image side surface of the first lens L1;

R3: central curvature radius of an object side surface of a second lens L2;

R4: central curvature radius of an image side surface of the second lens L2;

R5: central curvature radius of an object side surface of a third lens L3;

R6: central curvature radius of an image side surface of the third lens L3;

R7: central curvature radius of an object side surface of a fourth lens L4;

R8: central curvature radius of an image side surface of the fourth lens L4;

R9: central curvature radius of an object side surface of a fifth lens L5;

R10: central curvature radius of an image side surface of the fifth lens L5;

R11: central curvature radius of an object side surface of an optical filter GF;

R12: central curvature radius of an image side surface of the optical filter GF;

d: on-axis thickness of a lens, on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from an image side surface of the fifth lens L5 to an object side surface of the optical filter GF;

d11: on-axis thickness of the optical filter GF;

d12: on-axis distance from an image side surface of the optical filter GF to an image plane;

nd: refractive index of d-line;

nd1: refractive index of d-line of the first lens L1;

nd2: refractive index of d-line of the second lens L2;

nd3: refractive index of d-line of the third lens L3;

nd4: refractive index of d-line of the fourth lens L4;

nd5: refractive index of d-line of the fifth lens L5;

ndg: refractive index of d-line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

Table 2 shows aspherical data of the respective lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | 8.9119E−02 | −9.4634E−03 | 1.2730E−01 | −9.1550E−01 | 4.3195E+00 | −1.2314E+01 |
| R2 | 1.7361E+01 | 2.6012E−03 | −1.7267E−01 | 1.8865E+00 | −1.1413E+01 | 4.1599E+01 |
| R5 | 1.0450E+02 | −1.9501E−01 | 6.5207E−01 | −5.3452E+00 | 2.6907E+01 | −8.9158E+01 |
| R6 | 3.3303E+02 | −1.4544E−01 | 2.7881E−01 | −1.6971E+00 | 6.0171E+00 | −1.4445E+01 |
| R7 | 2.1211E+01 | −7.2907E−04 | −1.1119E−02 | −2.0826E−01 | 4.7454E−01 | −5.2399E−01 |
| R8 | −1.7612E−01 | 2.1412E−02 | −3.2476E−03 | −6.8585E−02 | 1.1629E−01 | −7.3081E−02 |
| R9 | −2.6663E+01 | −3.7914E−01 | 2.2117E−01 | −8.7972E−02 | 4.2120E−02 | −1.8515E−02 |
| R10 | −4.6545E+00 | −1.9095E−01 | 1.4039E−01 | −7.3940E−02 | 2.7440E−02 | −7.0621E−03 |

| | Cone coefficient | Aspherical coefficient | | | |
|---|---|---|---|---|---|
| | k | A14 | A16 | A18 | A20 |
| R1 | 8.9119E−02 | 2.1416E+01 | −2.2325E+01 | 1.2881E+01 | −3.1869E+00 |
| R2 | 1.7361E+01 | −9.2289E+01 | 1.2075E+02 | −8.5363E+01 | 2.5041E+01 |
| R5 | 1.0450E+02 | 1.8691E+02 | −2.3709E+02 | 1.6487E+02 | −4.7757E+01 |
| R6 | 3.3303E+02 | 2.2412E+01 | −2.1277E+01 | 1.1125E+01 | −2.4090E+00 |
| R7 | 2.1211E+01 | 3.2938E−01 | −1.2013E−01 | 2.4075E−02 | −2.0972E−03 |
| R8 | −1.7612E−01 | 2.3875E−02 | −4.3469E−03 | 4.2673E−04 | −1.8775E−05 |
| R9 | −2.6663E+01 | 5.2526E−03 | −8.6847E−04 | 7.6821E−05 | −2.8218E−06 |
| R10 | −4.6545E+00 | 1.2228E−03 | −1.3503E−04 | 8.5256E−06 | −2.3251E−07 |

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

Herein, k represents a cone coefficient, A4, A6, A8, A10, A12, A14, A16, A18, and A20 represent aspherical coefficients, c represents a curvature at a center of the optical surface, r represents a vertical distance between a point on an aspherical curve and the optical axis, Z represents an aspherical depth (a vertical distance between a point on the aspherical surface that is distanced from the optical axis by r and a surface tangent to a vertex of the aspherical surface on the optic axis).

For convenience, the aspherical surface of each lens adopts the aspherical surface shown in the above equation (1). However, the present invention is not limited to the aspherical surface defined by the polynomial expressed by the equation (1).

Table 3 shows free-form surface data in the camera optical lens 10 according to Embodiment 1 of the present invention.

TABLE 3

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R3 | −1.6228E+02 | −3.7778E−02 | −7.6860E−02 | −3.6924E−02 | 1.4834E−01 | 4.4248E−01 | 4.4243E−01 | 1.4847E−01 |
| R4 | 2.0016E+03 | 1.6878E−01 | 3.3321E−01 | 1.6971E−01 | −2.7108E−01 | −8.1141E−01 | −8.0945E−01 | −2.7070E−01 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R3 | −1.0330E+02 | −5.1650E+01 | −1.0331E+01 | 3.7384E+01 | 2.2433E+02 | 5.6076E+02 | 7.4777E+02 | 5.6074E+02 |
| R4 | −1.7491E+02 | −8.7484E+01 | −1.7493E+01 | 6.0675E+01 | 3.6405E+02 | 9.1015E+02 | 1.2135E+03 | 9.1011E+02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R3 | −5.6798E+02 | −8.1143E+01 | 1.0554E+02 | 8.4426E+02 | 2.9551E+03 | 5.9099E+03 | 7.3877E+03 | 5.9102E+03 |
| R4 | −8.8742E+02 | −1.2679E+02 | 1.5700E+02 | 1.2561E+03 | 4.3960E+03 | 8.7921E+03 | 1.0990E+04 | 8.7923E+03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R3 | −9.4709E+03 | −6.3134E+03 | −2.7060E+03 | −6.7652E+02 | −7.5159E+01 | 2.2349E+01 | 2.2350E+02 | 1.0054E+03 |
| R4 | −1.3314E+04 | −8.8767E+03 | −3.8038E+03 | −9.5097E+02 | −1.0566E+02 | 2.9810E+01 | 2.9749E+02 | 1.3406E+03 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R3 | 1.3427E+00 | 5.3651E+00 | 8.0615E+00 | 5.3638E+00 | 1.3421E+00 | −1.0331E+01 | −5.1646E+01 | −1.0330E+02 |
| R4 | 2.9510E+00 | 1.1806E+01 | 1.7722E+01 | 1.1799E+01 | 2.9509E+00 | −1.7491E+01 | −8.7466E+01 | −1.7490E+02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R3 | 2.2433E+02 | 3.7381E+01 | −8.1145E+01 | −5.6799E+02 | −1.7040E+03 | −1.8400E+03 | −2.8399E+03 | −1.7041E+03 |
| R4 | 3.6406E+02 | 6.0672E+01 | −1.2679E+02 | −8.8750E+02 | −2.6626E+03 | −4.4376E+03 | −4.4377E+03 | −2.6625E+03 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R3 | 2.9549E+03 | 8.4432E+02 | 1.0554E+02 | −7.5158E+01 | −6.7654E+02 | −2.7058E+03 | −6.3139E+03 | −9.4707E+03 |
| R4 | 4.3961E+03 | 1.2562E+03 | 1.5700E+02 | −1.0567E+02 | −9.5091E+02 | −3.8041E+03 | −8.8763E+03 | −1.3315E+04 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R3 | 2.6817E+03 | 4.6934E+03 | 5.6278E+03 | 4.6912E+03 | 2.6831E+03 | 1.0061E+03 | 2.2335E+02 | 2.2349E+01 |
| R4 | 3.5758E+03 | 6.2533E+03 | 7.5091E+03 | 6.2568E+03 | 3.5737E+03 | 1.3397E+03 | 2.9732E+02 | 2.9809E+01 |

$$z = \frac{cr^2}{1+\sqrt{1-(1+k)c^2r^2}} + \sum_{i=1}^{N} B_i E_i(x, y) \quad (2)$$

Herein, k represents a cone coefficient, Bi represents an aspherical coefficient, Ei(x,y)=$x^m y^n$ (where values of m and n correspond to the $x^m y^n$ items listed in Table 3), c represents the curvature at a center of the optical surface, r represents a vertical distance between a point on the free-form surface and the optical axis, x represents the x-direction component of r, y represents the y-direction component of r, z represents an aspherical depth (a vertical distance between a point on the aspherical surface that is distanced from the optical axis by r and a surface tangent to a vertex of the aspherical surface on the optic axis). In this embodiment, N=63, and in other embodiments, N may take other values.

For convenience, each free-form surface adopts the surface type defined by the extended polynomial shown in the above equation (2). However, the present invention is not limited to the free-form surface defined by the polynomial expressed by the equation (2).

Figure 2:
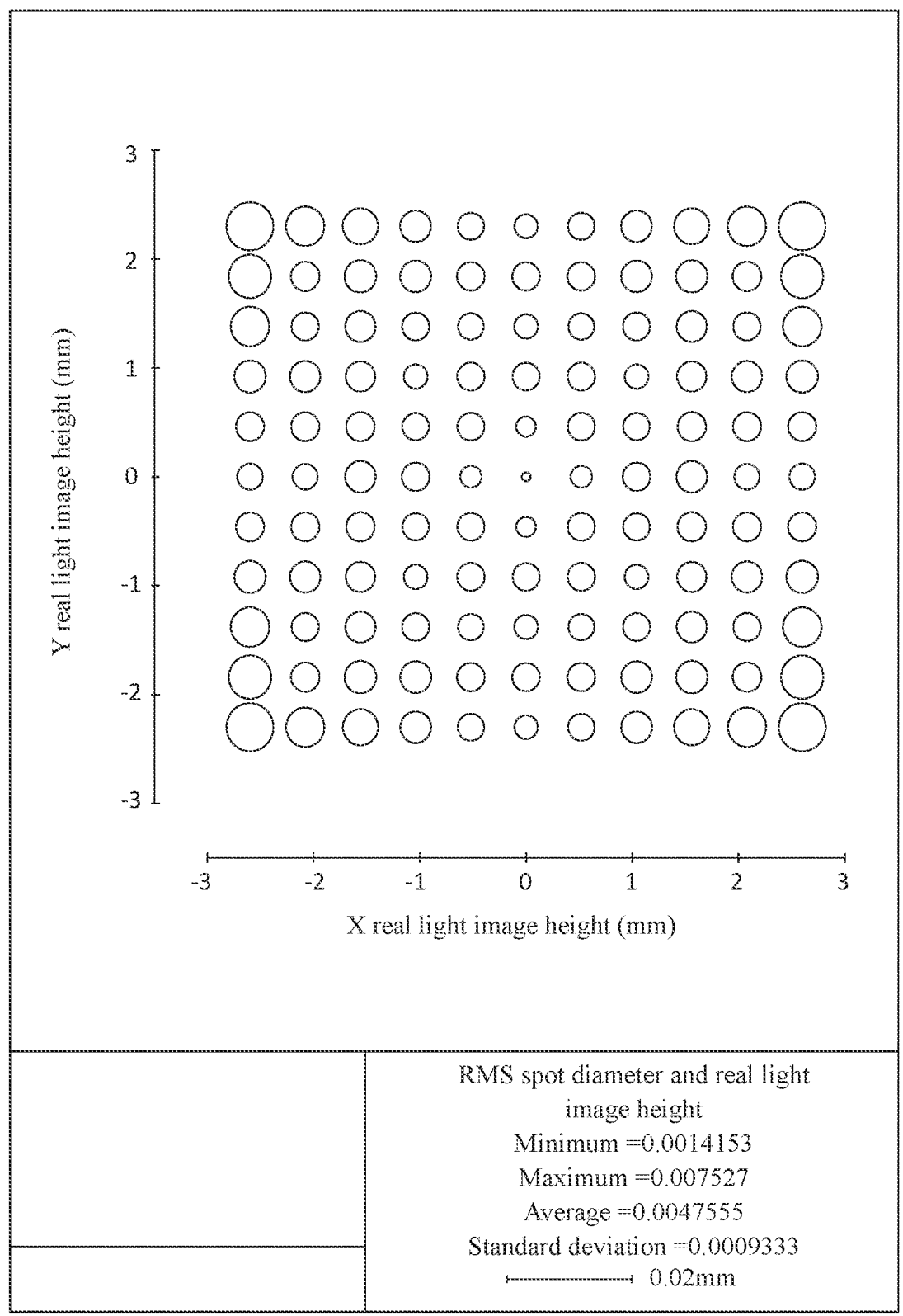
FIG. 2 illustrates correspondence between an RMS spot diameter and a real light image height of the camera optical lens shown in FIG. 1.

FIG. 2 illustrates correspondence between the RMS spot diameter and a real light image height of the camera optical lens 10 of Embodiment 1. According to FIG. 2, it can be seen that the camera optical lens 10 according to Embodiment 1 can achieve good imaging quality.

Various numerical values and values corresponding to the parameters already specified in the conditions for each of Embodiments 1, 2, 3 and 4 are listed in Table 13.

As shown in Table 13, Embodiment 1 satisfies respective conditions.

In this embodiment, the entrance pupil diameter ENPD of the camera optical lens 10 is 1.806 mm, the full filed of view image height IH (in a diagonal direction) is 6.940 mm, the image height in an x direction is 5.200 mm, the image height in a y direction is 4.600 mm, and the imaging effect is the best in this rectangular area; the FOV in a diagonal direction is 85.95°, the FOV in the x direction is 69.86°, and the FOV in the y direction is 63.46°. The camera optical lens 10 satisfies the design requirements of a wide angle, ultra-thinness and a large aperture, its on-axis and off-axis color aberrations are sufficiently corrected, and the camera optical lens has excellent optical characteristics.

Embodiment 2

Embodiment 2 is basically the same as Embodiment 1, the symbols in Embodiment 2 are the same as those in Embodiment 1, and only the difference from Embodiment 1 will be described in the following.

Figure 3:
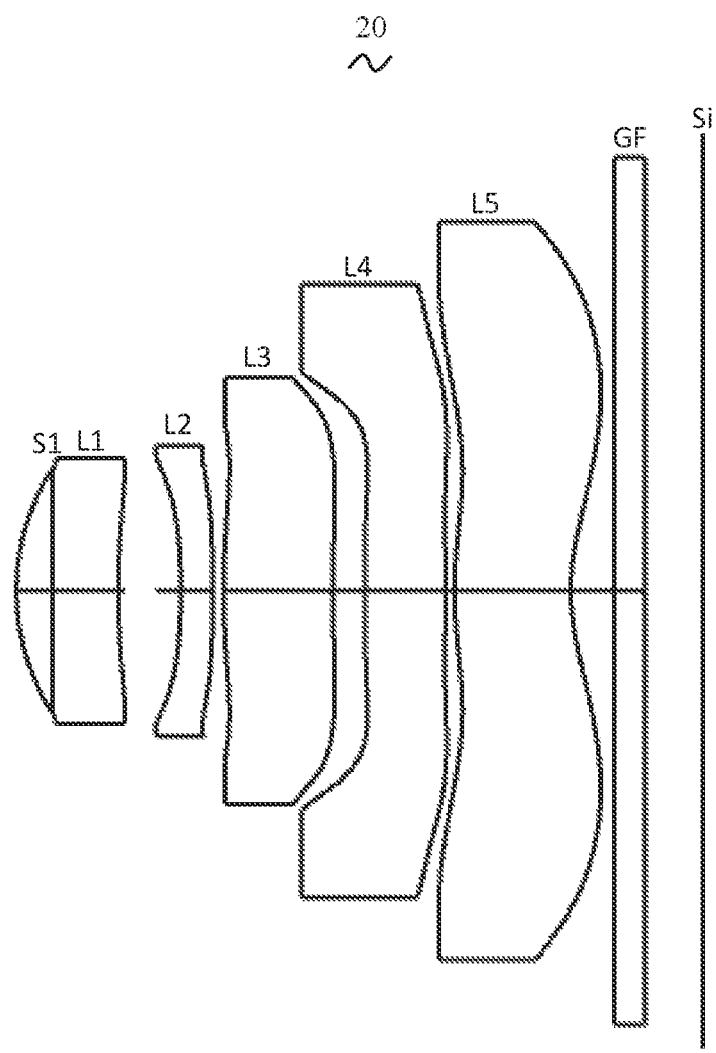
FIG. 3 is a schematic structural diagram of a camera optical lens according to Embodiment 2 of the present invention.

FIG. 3 illustrates a camera optical lens 20 according to Embodiment 2 of the present invention. In this embodiment, the image side surface of the third lens L3 is a concave surface at a paraxial position.

Table 4 and Table 5 show design data of the camera optical lens 20 according to Embodiment 2 of the present invention. Herein, only the object side surface and the image side surface of the fifth lens L5 are free-form surfaces, but in other embodiments, more than one lenses may have the free-form surface.

TABLE 4

| | R | d | | nd | | vd |
|---|---|---|---|---|---|---|
| S1 | ∞ | d0 = | −0.247 | | | |
| R1 | 1.502 | d1 = | 0.700 | nd1 | 1.5440 | v1 | 56.40 |
| R2 | 4.924 | d2 = | 0.432 | | | |
| R3 | −4.437 | d3 = | 0.220 | nd2 | 1.6800 | v2 | 18.40 |
| R4 | −14.286 | d4 = | 0.076 | | | |
| R5 | 5.207 | d5 = | 0.755 | nd3 | 1.5440 | v3 | 56.40 |
| R6 | 29.965 | d6 = | 0.219 | | | |
| R7 | −21.334 | d7 = | 0.555 | nd4 | 1.6800 | v4 | 18.40 |
| R8 | −8.212 | d8 = | 0.060 | | | |
| R9 | 2.738 | d9 = | 0.802 | nd5 | 1.6800 | v5 | 18.40 |
| R10 | 1.478 | d10 = | 0.300 | | | |
| R11 | ∞ | d11 = | 0.210 | ndg | 1.5168 | vg | 64.17 |
| R12 | ∞ | d12 = | 0.395 | | | |

Table 5 shows aspherical data of the respective lenses in the camera optical lens 20 according to Embodiment 2 of the present invention.

TABLE 5

| | Cone coefficient | Aspherical coefficient | | | | |
|---|---|---|---|---|---|---|
| | k | A4 | A6 | A8 | A10 | A12 |
| R1 | −8.6907E−02 | 6.1392E−03 | −1.6855E−02 | 1.1765E−02 | −1.5735E−02 | 0.0000E+00 |
| R2 | 9.1152E+00 | −1.5360E−02 | −4.2893E−02 | 5.9018E−02 | −2.2291E−01 | 2.6032E−01 |
| R3 | 2.0426E+01 | −5.7434E−02 | −1.0104E−01 | 2.0773E−01 | −4.2922E−01 | 5.7788E−01 |
| R4 | −1.0000E+01 | −6.3558E−02 | −1.1590E−01 | 1.6960E−01 | −1.1876E−01 | 8.7149E−02 |
| R5 | 2.9034E+00 | −3.6076E−02 | −5.8218E−02 | 4.2200E−02 | −1.3622E−02 | −1.7340E−02 |
| R6 | 1.0000E+01 | 7.7559E−02 | −2.7202E−01 | 3.6902E−01 | −3.4935E−01 | 2.0032E−01 |
| R7 | 1.0000E+01 | 2.3577E−01 | −3.7739E−01 | 2.7467E−01 | −1.3089E−01 | 2.2687E−02 |
| R8 | 5.5780E+00 | 1.9083E−01 | −2.1048E−01 | 1.3309E−01 | −6.1401E−02 | 1.9519E−02 |

| | Cone coefficient | Aspherical coefficient | | | |
|---|---|---|---|---|---|
| | k | A14 | A16 | A18 | A20 |
| R1 | −8.6907E−02 | 0.0000E+00 | 0.0000E+00 | 0.0000E+00 | 0.0000E+00 |
| R2 | 9.1152E+00 | −1.3901E−01 | 0.0000E+00 | 0.0000E+00 | 0.0000E+00 |
| R3 | 2.0426E+01 | −2.0460E−01 | 0.0000E+00 | 0.0000E+00 | 0.0000E+00 |
| R4 | −1.0000E+01 | 2.0501E−02 | 0.0000E+00 | 0.0000E+00 | 0.0000E+00 |
| R5 | 2.9034E+00 | 1.3005E−02 | 0.0000E+00 | 0.0000E+00 | 0.0000E+00 |
| R6 | 1.0000E+01 | −6.5555E−02 | 9.4630E−03 | 0.0000E+00 | 0.0000E+00 |
| R7 | 1.0000E+01 | 9.4982E−04 | 0.0000E+00 | 0.0000E+00 | 0.0000E+00 |
| R8 | 5.5780E+00 | −3.8099E−03 | 4.0327E−04 | −1.7688E−05 | 0.0000E+00 |

Table 6 shows the free-form surface data in the camera optical lens 20 according to Embodiment 2 of the present invention.

TABLE 6

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R9 | 2.7898E+00 | −1.6185E−01 | −3.2371E−01 | −1.6257E−01 | 4.3385E−03 | 1.2931E−02 | 1.3099E−02 | 5.6711E−03 |
| R10 | 5.8961E+00 | −9.1804E−02 | −1.8310E−01 | −9.2721E−02 | 3.6518E−02 | 1.0943E−01 | 1.0857E−01 | 3.7774E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R9 | −2.6810E−01 | −1.3366E−01 | −2.6929E−02 | 4.5216E−03 | 2.7081E−02 | 6.7702E−02 | 9.0111E−02 | 6.7971E−02 |
| R10 | 3.5532E−02 | 1.7874E−02 | 3.7035E−03 | −8.6551E−04 | −5.1929E−03 | −1.3025E−02 | −1.7257E−02 | −1.3039E−02 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R9 | 3.7777E−03 | 5.7313E−04 | −3.2868E−04 | −2.6240E−03 | −9.1978E−03 | −1.8371E−02 | −2.2966E−02 | −1.8402E−02 |
| R10 | 1.2416E−03 | 1.7161E−04 | −2.7457E−05 | −2.2015E−04 | −7.6862E−04 | −1.5406E−03 | −1.9357E−03 | −1.5268E−03 |

TABLE 6-continued

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R9 | 6.0162E−03 | 3.9981E−03 | 1.7134E−03 | 4.2676E−04 | 4.2981E−05 | −2.3980E−06 | −2.4371E−05 | −1.0962E−04 |
| R10 | 3.2427E−04 | 2.1590E−04 | 9.1360E−05 | 2.2386E−05 | 3.1955E−06 | −1.0328E−07 | −1.0115E−06 | −4.6729E−06 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R9 | 5.1636E−02 | 2.0689E−01 | 3.1073E−01 | 2.0553E−01 | 5.1058E−02 | −2.6788E−02 | −1.3414E−01 | −2.6803E−01 |
| R10 | −1.2675E−02 | −5.0656E−02 | −7.5358E−02 | −5.0459E−02 | −1.3342E−02 | 3.5765E−03 | 1.7870E−02 | 3.5694E−02 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R9 | 2.7197E−02 | 4.5598E−03 | 5.4036E−04 | 3.7898E−03 | 1.1387E−02 | 1.8875E−02 | 1.8986E−02 | 1.1352E−02 |
| R10 | −5.1812E−03 | −8.4952E−04 | 1.7829E−04 | 1.2479E−03 | 3.7528E−03 | 6.2541E−03 | 6.2392E−03 | 3.7611E−03 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R9 | 9.2147E−03 | −2.6355E−03 | −3.2249E−04 | 4.7653E−05 | 4.2988E−04 | 1.7202E−03 | 4.0116E−03 | 6.0340E−03 |
| R10 | 7.6552E−04 | −2.2485E−04 | −2.9087E−05 | 2.5620E−06 | 2.3046E−05 | 9.2250E−05 | 2.1476E−04 | 3.2138E−04 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R9 | 2.9271E−04 | −5.1215E−04 | −6.1611E−04 | −5.0969E−04 | −2.8901E−04 | −1.0386E−04 | −2.4601E−05 | −1.9783E−06 |
| R10 | 1.2190E−05 | −2.1577E−05 | −2.4736E−05 | −2.2659E−05 | −1.3012E−05 | −4.5155E−06 | −1.8579E−07 | −1.4267E−07 |

Figure 4:
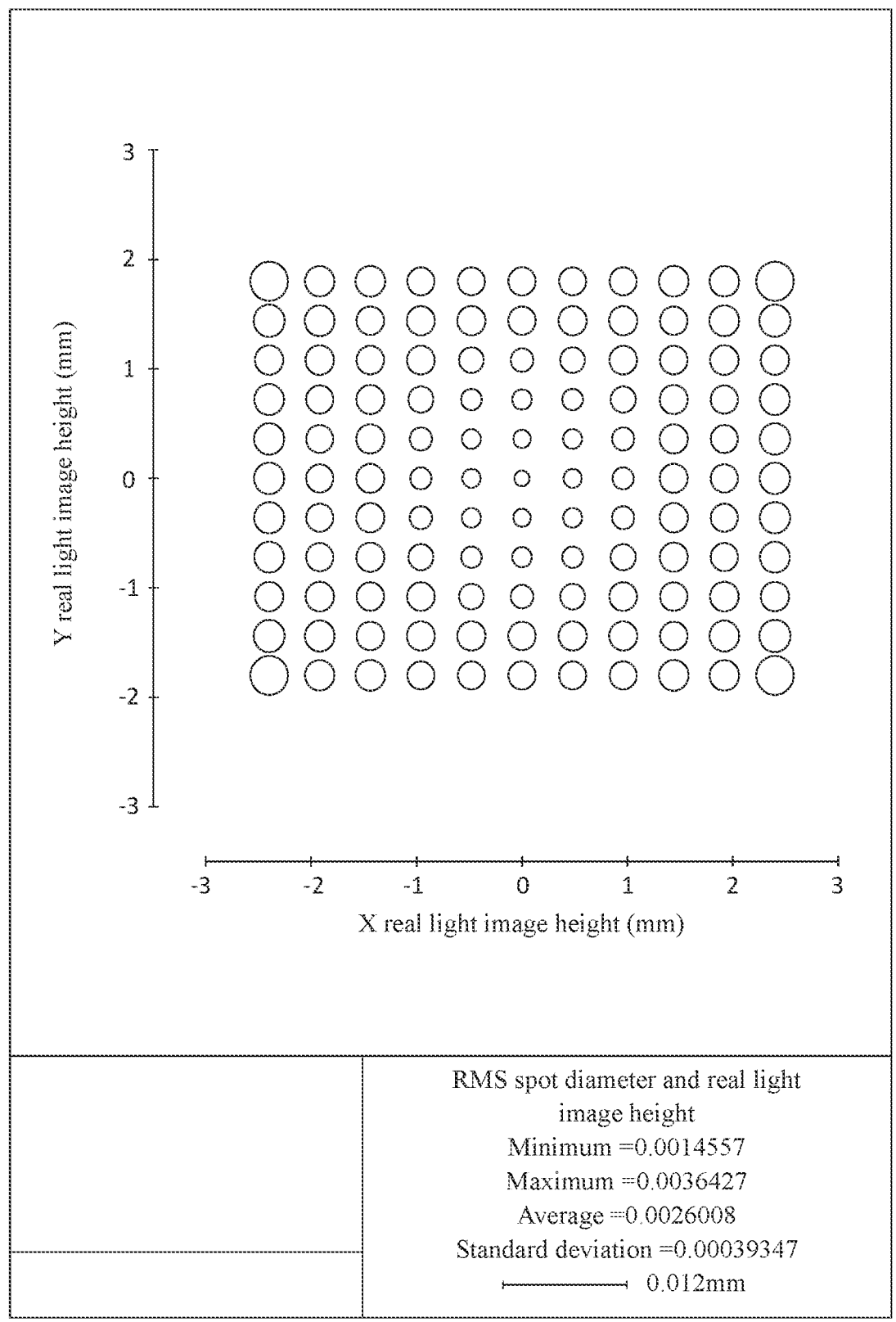
FIG. 4 illustrates correspondence between an RMS spot diameter and a real light image height of the camera optical lens shown in FIG. 3.

FIG. 4 illustrates the correspondence between the RMS spot diameter and a real light image height of the camera optical lens 20 of Embodiment 2. According to FIG. 4, it can be seen that the camera optical lens 20 according to Embodiment 2 can achieve good imaging quality.

As shown in Table 13, Embodiment 2 satisfies the respective conditions.

In this embodiment, an entrance pupil diameter ENPD of the camera optical lens 20 is 1.682 mm, the full field of view image height IH (in a diagonal direction) is 6.000 mm, the image height in an x direction is 4.800 mm, the image height in a y direction is 3.600 mm, and the imaging effect is the best in this rectangular area; the FOV in a diagonal direction is 78.00°, the FOV in the x direction is 65.65°, and the FOV in the y direction is 51.25°. The camera optical lens 20 satisfies the design requirements of a wide angle, ultra-thinness and a large aperture, its on-axis and off-axis color aberrations are sufficiently corrected, and the camera optical lens has excellent optical characteristics Embodiment 3

Embodiment 3 is basically the same as Embodiment 1, the symbols in Embodiment 3 are defined the same as those in Embodiment 1, and only the difference from Embodiment 1 will be described in the following.

Figure 5:
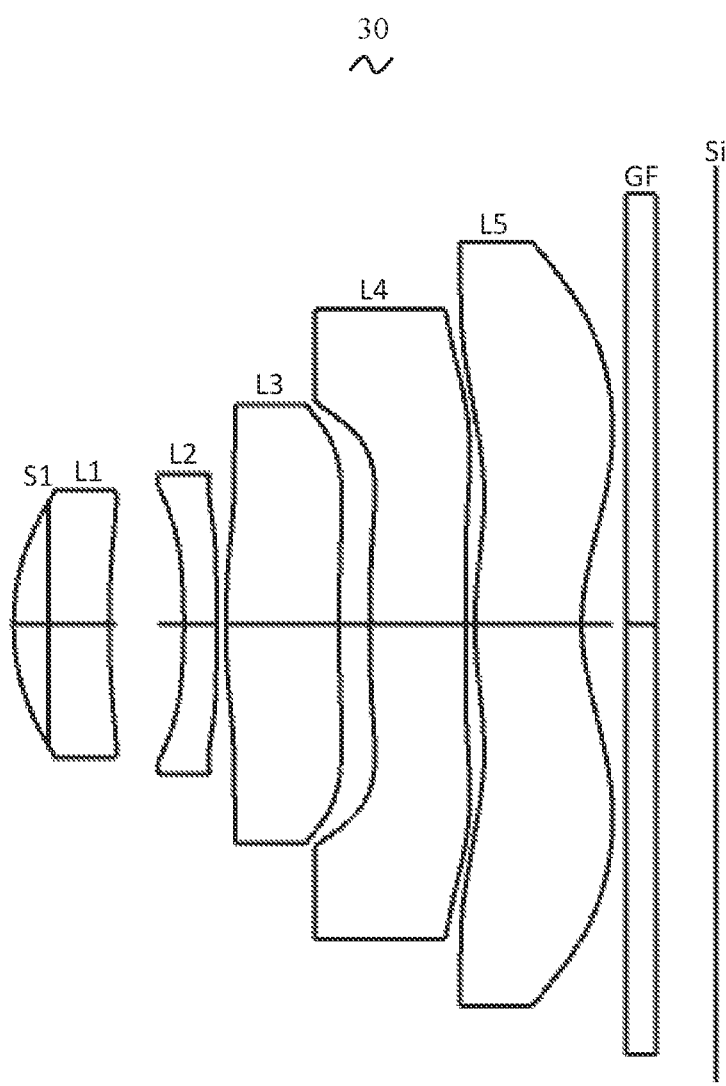
FIG. 5 is a schematic structural diagram of a camera optical lens according to Embodiment 3 of the present invention.

FIG. 5 illustrates a camera optical lens 30 according to Embodiment 3 of the present invention. In this embodiment, the image side surface of the third lens L3 is a concave surface at a paraxial position, and the object side surface of the fourth lens L4 is a convex surface at a paraxial position.

Table 7 and Table 8 show design data of the camera optical lens 30 according to Embodiment 3 of the present invention. Only the object side surface and the image side surface of the first lens L1 are free-form surfaces. In other embodiments, more than one lenses may have the free-form surface.

TABLE 7

| | R | d | | nd | | vd |
|---|---|---|---|---|---|---|
| S1 | ∞ | d0 = | −0.243 | | | |
| R1 | 1.532 | d1 = | 0.650 | nd1 | 1.5440 | v1 56.40 |
| R2 | 5.254 | d2 = | 0.509 | | | |
| R3 | −4.714 | d3 = | 0.221 | nd2 | 1.6800 | v2 18.40 |
| R4 | −76.923 | d4 = | 0.062 | | | |
| R5 | 4.016 | d5 = | 0.769 | nd3 | 1.5440 | v3 56.40 |
| R6 | 12.761 | d6 = | 0.211 | | | |
| R7 | 29.119 | d7 = | 0.653 | nd4 | 1.6800 | v4 18.40 |
| R8 | −10.528 | d8 = | 0.060 | | | |
| R9 | 2.682 | d9 = | 0.724 | nd5 | 1.6800 | v5 18.40 |
| R10 | 1.425 | d10 = | 0.300 | | | |
| R11 | ∞ | d11 = | 0.210 | ndg | 1.5168 | vg 64.17 |
| R12 | ∞ | d12 = | 0.400 | | | |

Table 8 shows aspherical data of the respective lenses in the camera optical lens 30 according to Embodiment 3 of the present invention.

TABLE 8

| | Cone coefficient | Aspherical coefficient | | | | |
|---|---|---|---|---|---|---|
| | k | A4 | A6 | A8 | A10 | A12 |
| R3 | 2.0491E+01 | −5.5552E−02 | −1.6372E−01 | 5.0690E−01 | −1.0605E+00 | 1.2714E+00 |
| R4 | −1.0000E+01 | −7.6996E−02 | −1.7519E−01 | 4.6439E−01 | −6.4397E−01 | 5.5232E−01 |
| R5 | 2.4791E−01 | −5.5082E−02 | −6.7027E−02 | 1.4935E−01 | −1.8040E−01 | 1.0925E−01 |
| R6 | −1.0000E+01 | 4.9403E−02 | −1.8177E−01 | 2.0762E−01 | −1.5915E−01 | 7.1810E−02 |
| R7 | −1.4000E+01 | 1.6521E−01 | −2.5742E−01 | 1.5410E−01 | −5.5372E−02 | 2.2305E−03 |
| R8 | 9.9888E+00 | 1.8968E−01 | −2.0430E−01 | 1.2159E−01 | −4.9615E−02 | 1.3562E−02 |

TABLE 8-continued

| | | | | | | |
|---|---|---|---|---|---|---|
| R9 | −2.6697E+00 | −1.2862E−01 | −3.0994E−02 | 6.4394E−02 | −2.7548E−02 | 4.2941E−03 |
| R10 | −5.4014E+00 | −9.4637E−02 | 3.3835E−02 | −9.9829E−03 | 2.0930E−03 | −3.2399E−04 |

| | Cone coefficient | Aspherical coefficient | | | |
|---|---|---|---|---|---|
| | k | A14 | A16 | A18 | A20 |
| R3 | 2.0491E+01 | −5.4952E−01 | 0.0000E+00 | 0.0000E+00 | 0.0000E+00 |
| R4 | −1.0000E+01 | −1.6199E−01 | 0.0000E+00 | 0.0000E+00 | 0.0000E+00 |
| R5 | 2.4791E−01 | −2.3891E−02 | 0.0000E+00 | 0.0000E+00 | 0.0000E+00 |
| R6 | −1.0000E+01 | −1.8931E−02 | 2.3895E−03 | 0.0000E+00 | 0.0000E+00 |
| R7 | −1.4000E+01 | 2.2268E−03 | 0.0000E+00 | 0.0000E+00 | 0.0000E+00 |
| R8 | 9.9888E+00 | −2.2847E−03 | 2.1106E−04 | −8.1360E−06 | 0.0000E+00 |
| R9 | −2.6697E+00 | 3.4037E−04 | −2.2107E−04 | 2.9953E−05 | −1.4082E−06 |
| R10 | −5.4014E+00 | 5.6231E−05 | −1.1454E−05 | 1.4403E−06 | −7.0236E−08 |

Table 9 shows free-form surface data in the camera optical lens 30 according to Embodiment 3 of the present invention.

TABLE 9

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −1.1809E−01 | 5.4655E−03 | 1.0177E−02 | 5.1330E−03 | −4.0246E−03 | −1.0285E−02 | −7.8077E−03 | −2.4714E−03 |
| R2 | 9.9996E+00 | −1.5214E−02 | −3.1094E−02 | −1.5305E−02 | −5.0588E−02 | −1.4743E−01 | −1.4900E−01 | −4.9410E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | 1.8088E−01 | −9.0239E−02 | −1.7883E−02 | 0.0000E+00 | 0.0000E+00 | 0.0000E+00 | 0.0000E+00 | 0.0000E+00 |
| R2 | 3.5198E+00 | −1.8272E+00 | −3.6400E−01 | 4.3999E−01 | 2.6534E+00 | 6.6933E+00 | 8.6108E+00 | 6.4722E+00 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | −1.5968E+00 | −2.2776E−01 | 0.0000E+00 | 0.0000E+00 | 0.0000E+00 | 0.0000E+00 | 0.0000E+00 | 0.0000E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | 1.2789E−02 | 4.9848E−02 | 6.9519E−02 | 4.3990E−02 | 1.0689E−02 | −1.8774E−02 | −9.3361E−02 | −1.8314E−01 |
| R2 | 1.2110E−01 | 4.7381E−01 | 6.9925E−01 | 4.7941E−01 | 1.1852E−01 | −3.6328E−01 | −1.8125E+00 | −3.5987E+00 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 2.6864E+00 | 4.4684E−01 | −2.2271E−01 | −1.5687E+00 | −4.7931E+00 | −7.7941E+00 | −7.6324E+00 | −4.6572E+00 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

Figure 6:
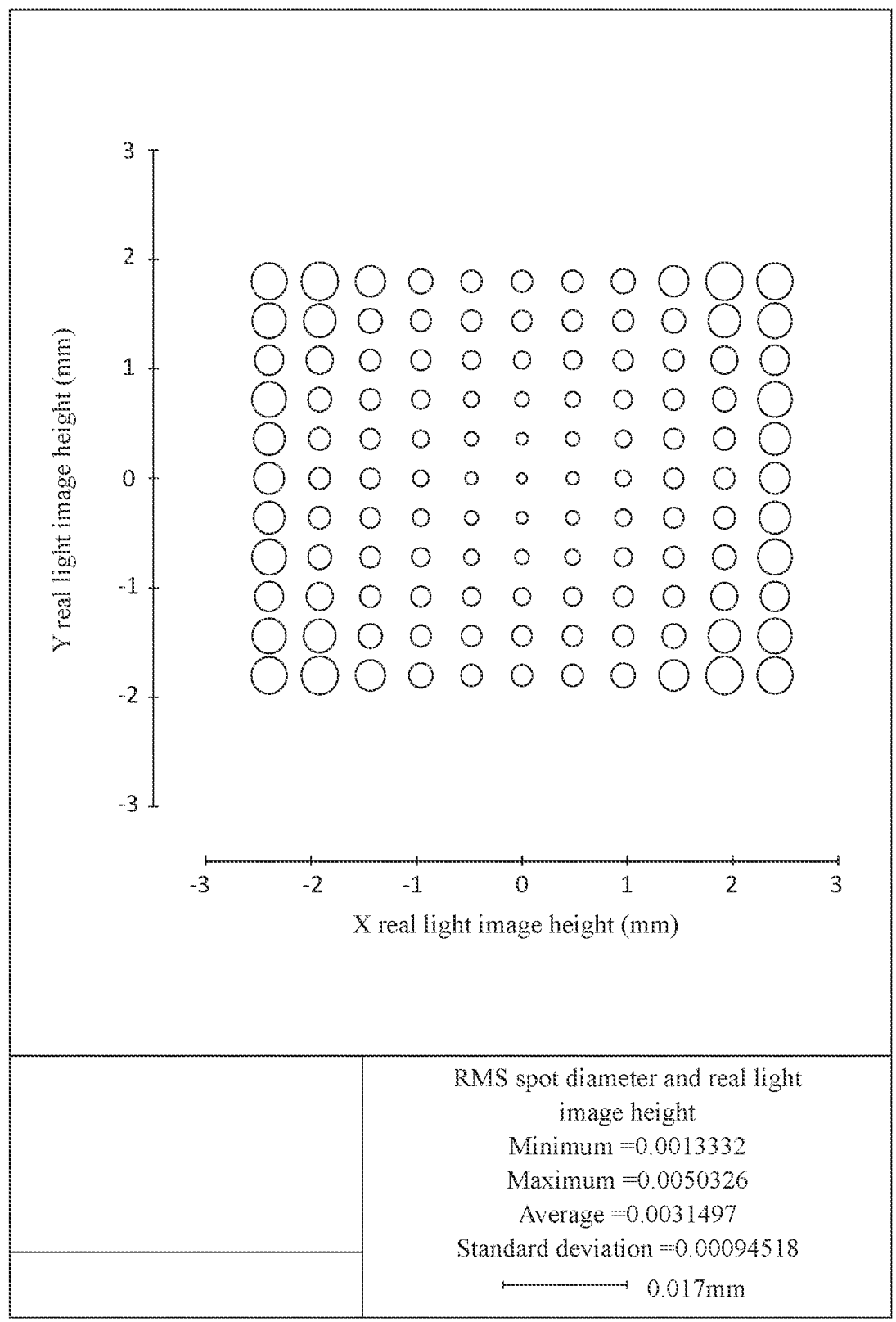
FIG. 6 illustrates correspondence between an RMS spot diameter and a real light image height of the camera optical lens shown in FIG. 5.

FIG. 6 illustrates correspondence between the RMS spot diameter and a real light image height of the camera optical lens 30 of Embodiment 3. According to FIG. 6, it can be seen that the camera optical lens 30 according to Embodiment 3 can achieve good imaging quality.

The numerical values corresponding to the respective conditions in this embodiment according to the above-mentioned conditions are listed in Table 13. Obviously, the imaging optical system according to this embodiment satisfies the above-mentioned conditions.

In this embodiment, an entrance pupil diameter ENPD of the camera optical lens 30 is 1.695 mm, the full field of view image height IH (in a diagonal direction) is 6.000 mm, the image height in an x direction is 4.800 mm, the image height in a y direction is 3.600 mm, and the imaging effect is the best in this rectangular area; the FOV in a diagonal direction is 77.50°, the FOV in the x direction is 65.30°, and the FOV in the y direction is 50.91°. The camera optical lens 30 satisfies the design requirements of a wide angle, ultra-thinness and a large aperture, its on-axis and off-axis color aberrations are sufficiently corrected, and the camera optical lens has excellent optical characteristics.

Embodiment 4

Embodiment 4 is basically the same as the Embodiment 1, the symbols in Embodiment 4 are the same as those in Embodiment 1, and only the difference from Embodiment 1 will be described in the following.

Figure 7:
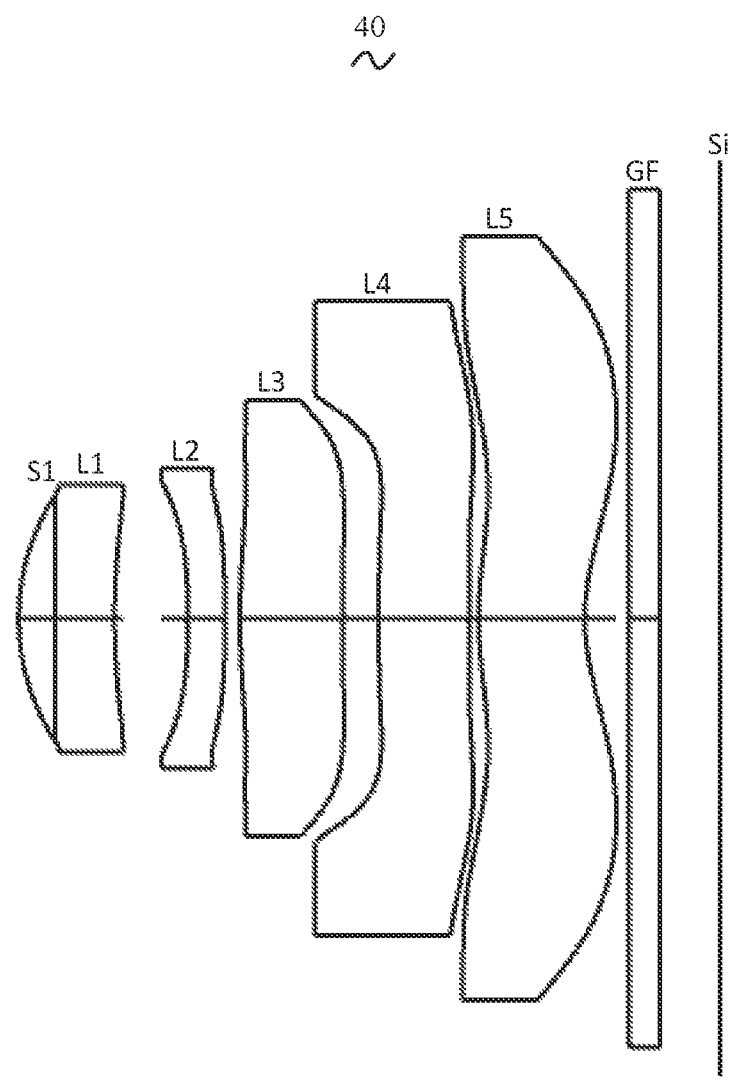
FIG. 7 is a schematic structural diagram of a camera optical lens according to Embodiment 4 of the present invention.

FIG. 7 illustrates a camera optical lens 40 according to Embodiment 4 of the present invention. In this embodiment, the image side surface of the third lens L3 is a concave surface at a paraxial position.

Table 10 and Table 11 show design data of the camera optical lens 40 according to Embodiment 4 of the present invention. Herein, only the object side surface and the image side surface of the first lens L1 are free-form surfaces, but in other embodiment, more than one lenses may have the free-form surface.

TABLE 10

| | R | d | nd | vd |
|---|---|---|---|---|
| S1 | ∞ | d0 = −0.245 | | |
| R1 | 1.529 | d1 = 0.650 | nd1 1.5440 | v1 56.40 |

TABLE 10-continued

| | R | d | nd | vd |
|---|---|---|---|---|
| R2 | 4.786 | d2 = 0.500 | | |
| R3 | −4.610 | d3 = 0.249 | nd2 1.6800 | v2 18.40 |
| R4 | −9.709 | d4 = 0.102 | | |
| R5 | 5.833 | d5 = 0.694 | nd3 1.5440 | v3 56.40 |
| R6 | 22.823 | d6 = 0.248 | | |
| R7 | −153.933 | d7 = 0.617 | nd4 1.6800 | v4 18.40 |
| R8 | −10.282 | d8 = 0.060 | | |
| R9 | 2.653 | d9 = 0.721 | nd5 1.6800 | v5 18.40 |
| R10 | 1.422 | d10 = 0.300 | | |
| R11 | ∞ | d11 = 0.210 | ndg 1.5168 | vg 64.17 |
| R12 | ∞ | d12 = 0.404 | | |

Table 11 shows aspherical data of each lens in the camera optical lens 40 according to Embodiment 4 of the present invention.

TABLE 11

| | Cone coefficient | Aspherical coefficient | | | | |
|---|---|---|---|---|---|---|
| | k | A4 | A6 | A8 | A10 | A12 |
| R3 | 2.0049E+01 | −6.7862E−02 | −1.3474E−01 | 3.9914E−01 | −8.6214E−01 | 1.1152E+00 |
| R4 | −1.0000E+01 | −6.1707E−02 | −1.9034E−01 | 4.4613E−01 | −5.8417E−01 | 5.0877E−01 |
| R5 | 6.8039E+00 | −1.8979E−02 | −1.1279E−01 | 1.7244E−01 | −1.6635E−01 | 8.8700E−02 |
| R6 | 1.0000E+01 | 4.2957E−02 | −1.6986E−01 | 1.9071E−01 | −1.5553E−01 | 7.6675E−02 |
| R7 | 1.0000E+01 | 1.6656E−01 | −2.5736E−01 | 1.5164E−01 | −5.3716E−02 | 1.4198E−03 |
| R8 | 7.9503E+00 | 1.9454E−01 | −2.1764E−01 | 1.3570E−01 | −5.7343E−02 | 1.6076E−02 |
| R9 | −2.7452E+00 | −1.3157E−01 | −2.7298E−02 | 6.4969E−02 | −2.9908E−02 | 5.4835E−03 |
| R10 | −5.2778E+00 | −9.9957E−02 | 4.2760E−02 | −1.7461E−02 | 6.3161E−03 | −1.8838E−03 |

| | Cone coefficient | Aspherical coefficient | | | |
|---|---|---|---|---|---|
| | k | A14 | A16 | A18 | A20 |
| R3 | 2.0049E+01 | −4.9657E−01 | 0.0000E+00 | 0.0000E+00 | 0.0000E+00 |
| R4 | −1.0000E+01 | −1.5015E−01 | 0.0000E+00 | 0.0000E+00 | 0.0000E+00 |
| R5 | 6.8039E+00 | −1.7851E−02 | 0.0000E+00 | 0.0000E+00 | 0.0000E+00 |
| R6 | 1.0000E+01 | −2.2413E−02 | 3.1268E−03 | 0.0000E+00 | 0.0000E+00 |
| R7 | 1.0000E+01 | 2.4322E−03 | 0.0000E+00 | 0.0000E+00 | 0.0000E+00 |
| R8 | 7.9503E+00 | −2.7763E−03 | 2.6413E−04 | −1.0552E−05 | 0.0000E+00 |
| R9 | −2.7452E+00 | 8.3669E−05 | −1.9792E−04 | 2.9828E−05 | −1.4810E−06 |
| R10 | −5.2778E+00 | 4.1663E−04 | −6.1366E−05 | 5.2245E−06 | −1.9091E−07 |

Table 12 shows free-form surface data in the camera optical lens 40 according to Embodiment 4 of the present invention.

TABLE 12

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −1.1434E−01 | 6.5583E−03 | 1.2263E−02 | 6.2745E−03 | −3.9438E−03 | −8.5743E−03 | −7.0410E−03 | −2.3442E−03 |
| R2 | 9.8691E+00 | −1.5527E−02 | −3.0947E−02 | −1.5596E−02 | −5.1003E−02 | −1.5121E−01 | −1.5226E−01 | −4.9572E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | −1.5969E−01 | −7.7301E−02 | −1.5532E−02 | 0.0000E+00 | 0.0000E+00 | 0.0000E+00 | 0.0000E+00 | 0.0000E+00 |
| R2 | −3.5221E+00 | −1.8266E+00 | −3.6489E−01 | 4.3601E−01 | 2.6545E+00 | 6.6910E+00 | 8.6657E+00 | 6.3977E+00 |

TABLE 12-continued

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | −1.6010E+00 | −2.2632E−01 | 0.0000E+00 | 0.0000E+00 | 0.0000E+00 | 0.0000E+00 | 0.0000E+00 | 0.0000E+00 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 1.3365E−02 | 4.7705E−02 | 7.1845E−02 | 4.3431E−02 | 1.0791E−02 | −1.6888E−02 | −7.9620E−02 | −1.6213E−01 |
| R2 | 1.2205E−01 | 4.7649E−01 | 7.0529E−01 | 4.8089E−01 | 1.1840E−01 | −3.6412E−01 | −1.8158E+00 | −3.6012E+00 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 2.6876E+00 | 4.4636E−01 | −2.1839E−01 | −1.5624E+00 | −4.8060E+00 | −7.8345E+00 | −7.6556E+00 | −4.5563E+00 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

Figure 8:
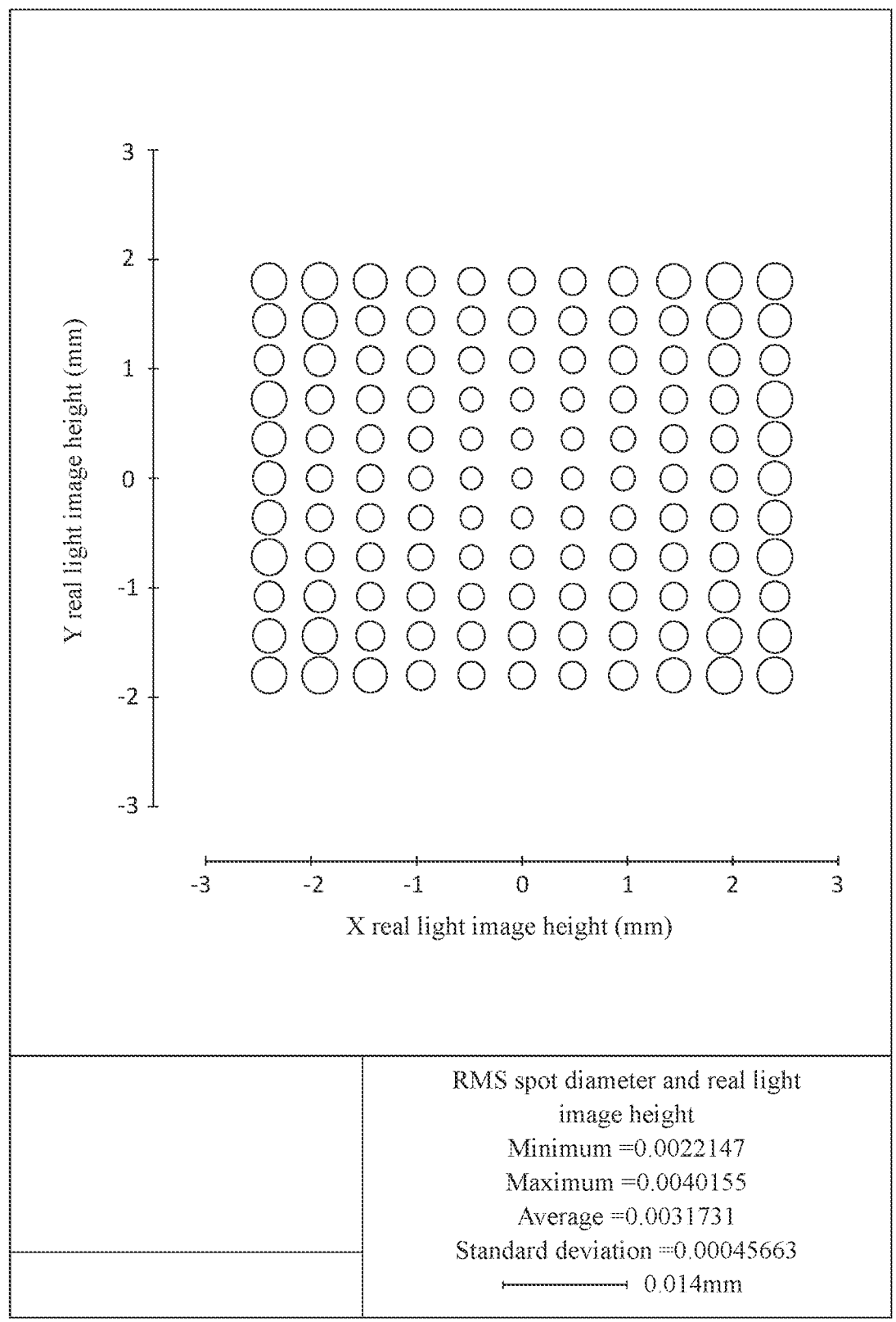
FIG. 8 illustrates correspondence between an RMS spot diameter and a real light image height of the camera optical lens shown in FIG. 7.

FIG. 8 illustrates correspondence between the RMS spot diameter and a real light image height of the camera optical lens 40 of Embodiment 4. According to FIG. 8, it can be seen that the camera optical lens 40 according to Embodiment 4 can achieve good imaging quality.

Table 13 lists numerical values corresponding to the respective conditions in this embodiment according to the above-mentioned conditions. It can be seen that the imaging optical system according to this embodiment satisfies the above-mentioned conditions.

In this embodiment, an entrance pupil diameter ENPD of the camera optical lens 40 is 1.695 mm, the full field of view image height IH (in a diagonal direction) is 6.000 mm, the image height in an x direction is 4.800 mm, the image height in a y direction is 3.600 mm, and the imaging effect is the best in this rectangular area; the FOV in a diagonal direction is 77.50°, the FOV in the x direction is 64.95°, and the FOV in the y direction is 50.70°. The camera optical lens 40 satisfies the design requirements of a wide angle, ultra-thinness and a large aperture, its on-axis and off-axis color aberrations are sufficiently corrected, and the camera optical lens has excellent optical characteristics.

TABLE 13

| Parameters and conditions | Embodiment 1 | Embodiment 2 | Embodiment 3 | Embodiment 4 |
|---|---|---|---|---|
| f2/f | −2.09 | −2.55 | −1.96 | −3.49 |
| (R5 + R6)/(R5 − R6) | 0.11 | −1.42 | −1.92 | −1.69 |
| f4/f | 1.09 | 5.15 | 3.03 | 4.28 |
| f | 3.611 | 3.700 | 3.730 | 3.730 |
| f1 | 3.288 | 3.691 | 3.728 | 3.843 |
| f2 | −7.560 | −9.432 | −7.300 | −13.007 |
| f3 | 19.478 | 11.413 | 10.405 | 14.139 |
| f4 | 3.928 | 19.057 | 11.303 | 15.969 |
| f5 | −2.773 | −6.292 | −5.770 | −5.842 |
| FNO | 2.00 | 2.20 | 2.20 | 2.20 |
| TTL | 4.408 | 4.724 | 4.769 | 4.755 |
| IH | 6.940 | 6.000 | 6.000 | 6.000 |
| FOV | 85.95° | 78.00° | 77.50° | 77.50° |

It should be understood by those skilled in the art that the above embodiments are merely some specific embodiments of the present invention, and various changes in form and details may be made without departing from the scope of the present invention.

What is claimed is:

1. A camera optical lens, comprising, from an object side to an image side:
   a first lens having a positive refractive power;
   a second lens having a negative refractive power;
   a third lens having a positive refractive power;
   a fourth lens having a positive refractive power; and
   a fifth lens having a negative refractive power,
   wherein at least one of the first lens to the fifth lens has a free-form surface, and the camera optical lens satisfies following conditions:

$-3.50 \leq f2/f \leq -1.50$;

$-2.00 \leq (R5+R6)/(R5-R6) \leq 0.20$;

$1.00 \leq f4/f \leq 5.50$, $-5.62 \leq (R3+R4)/(R3-R4) \leq -0.75$; and $0.02 \leq d3/TTL \leq 0.08$, where f denotes a focal length of the camera optical lens, f2 denotes a focal length of the second lens, f4 denotes a focal length of the fourth lens, R5 denotes a central curvature radius of an object side surface of the third lens, R6 denotes a central curvature radius of an image side surface of the third lens, R3 denotes a central curvature radius of an object side surface of the second lens, R4 denotes a central curvature radius of an image side surface of the second lens, d3 denotes an on-axis thickness of the second lens, and TTL denotes a total optical length from an object side surface of the first lens to an image plane of the camera optical lens along an optic axis.

2. The camera optical lens as described in claim 1, further satisfying a following condition:

$0.95 \leq d3/d4 \leq 4.00$, where d4 denotes an on-axis distance from an image side surface of the second lens to the object side surface of the third lens.

3. The camera optical lens as described in claim 1, further satisfying following conditions:

$0.46 \leq f1/f \leq 1.55$;

$-3.88 \leq (R1+R2)/(R1-R2) \leq -1.02$; and $0.06 \leq d1/TTL \leq 0.22$, where f1 denotes a focal length of the first lens, R1 denotes a central curvature radius of an object side surface of the first lens, R2 denotes a central curvature radius of an image side surface of the first lens, d1 denotes an on-axis thickness of the first lens.

4. The camera optical lens as described in claim 1, further satisfying following conditions:

$1.39 \leq f3/f \leq 8.09$; and $0.03 \leq d5/TTL \leq 0.24$, where f3 denotes a focal length of the third lens, d5 denotes an on-axis thickness of the third lens.

5. The camera optical lens as described in claim 1, further satisfying following conditions:

$0.23 \leq (R7+R8)(R7-R8) \leq 3.38$; and $0.06 \leq d7/TTL \leq 0.21$, where R7 denotes a central curvature radius of an object side surface of the fourth lens, R8 denotes a central curvature radius of an image side surface of the fourth lens, d7 denotes an on-axis thickness of the fourth lens.

6. The camera optical lens as described in claim 1, further satisfying following conditions:

$-3.40 \leq f5/f \leq -0.51$;

$0.79 \leq (R9+R10)/(R9-R10) \leq 5.02$; and $0.05 \leq d9/TTL \leq 0.25$, where f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens.

7. The camera optical lens as described in claim 1, further satisfying a following condition:

$TTL/IH \leq 1.60$, where IH denotes an image height of the camera optical lens.

8. The camera optical lens as described in claim 1, further satisfying a following condition:

$FOV \geq 2.21$, where FOV denotes a field of view of the camera optical lens.

9. The camera optical lens as described in claim 1, further satisfying a following condition:

$FNO \leq 2.21$, where FNO denotes an F number of the camera optical lens.

* * * * *